United States Patent [19]
Yin

[11] Patent Number: 5,926,458
[45] Date of Patent: Jul. 20, 1999

[54] METHOD AND APPARATUS FOR SERVICING MULTIPLE QUEUES

[75] Inventor: Nanying Yin, Newton Center, Mass.

[73] Assignee: Bay Networks, Santa Clara, Calif.

[21] Appl. No.: 08/792,099

[22] Filed: Jan. 31, 1997

Related U.S. Application Data

[51] Int. Cl.[6] .................................................. H04L 12/28
[52] U.S. Cl. ........................................... 370/230; 370/412
[58] Field of Search .................................... 370/230, 231, 370/235, 412, 468, 465, 416, 414, 418

[56] References Cited

U.S. PATENT DOCUMENTS

| | | | |
|---|---|---|---|
| 5,231,633 | 7/1993 | Hluchyj et al. | 370/94.1 |
| 5,268,900 | 12/1993 | Hluchyj et al. | 370/94.1 |
| 5,521,923 | 5/1996 | Willmann et al. | 370/94.1 |
| 5,541,919 | 7/1996 | Yong et al. | 370/416 |
| 5,570,360 | 10/1996 | Klausmeier et al. | 370/232 |

OTHER PUBLICATIONS

Lam, Store–and–Forward Buffer Requirements in a Packet Switching Network, IEEE Transactions on Communications, vol. Com–24, No. 4, pp. 394–403, Apr. 1976.

Kamoun et al. Analysis of Shared Finite Storage in a Computer Network Node Environment Under General Traffic Conditions, IEEE Transactions on Communications, vol. Com–28, No. 7, pp. 992–1003, Jul. 1980.

Hyman et al. Real–Time Scheduling with Quality of Service Constraints, IEEE Journal on Selected Areas in Communications, vol. 9, No. 7, pp. 1052–1063, Sep. 1991.

Clark et al, Supporting Real–Time Applications in an Integrated Services Packet Network: Architecture and Mechanism, Proceedings SIGCOMM '92, Baltimore MD, pp. 14–26, Aug. 1992.

Mercankosk et al, Multiplexing Spacer Outputs on Cell Emissions, Proceedings IEEE Infocom '95, Boston, MA, pp. 49–55, Apr. 1995.

*Primary Examiner*—Alpus H. Hsu
*Assistant Examiner*—Kim T. Nguyen
*Attorney, Agent, or Firm*—Blakely, Sokoloff, Taylor & Zafman LLP

[57] ABSTRACT

A system for servicing multiple queues identifies a queue service time associated with each of the multiple queues. The queue servicing system selects a particular queue service time having the minimal value of all identified queue service times. The system services the queue associated with the selected queue service time. A new queue service time is determined for the queue associated with the selected queue service time. The queue servicing system continuously services the queues while at least one of the queues contains data. The queue service time associated with a particular queue is calculated in response to the size of the packet at the head of the particular queue and a bandwidth allocated to the particular queue.

32 Claims, 6 Drawing Sheets

METHOD AND APPARATUS FOR SERVICING MULTIPLE QUEUES

BACKGROUND OF THE INVENTION

1. Field of the Invention

The present invention relates to queue servicing mechanisms. More specifically, the invention provides a system for servicing multiple packet queues.

2. Background

Various procedures and devices are used to transmit data between nodes in a network. For example, data may be transmitted through multiple intermediate network communication devices, such as routers and switches, located between a source node and a destination node. These intermediate network communication devices may contain one or more queues that temporarily store data awaiting transmission to another node or network communication device in the network.

In networks that transmit data using an Internet Protocol (IP), best-effort service is typically provided by the various network nodes. Best-effort service does not provide any Quality of Service (QOS) guarantees for a particular data stream. Instead, best-effort service transmits data in the order it was received using the node's available bandwidth. Thus, during heavy network usage periods, data may travel slowly and require a significant amount of time to travel from the source node to the destination node. However, during light network usage periods, the same data may travel through the network quickly such that the data reaches the destination node in a shorter period of time.

Since IP data is typically transmitted using best-effort service, the speed at which IP data travels through a network depends on the available bandwidth between the source node and the destination node. Thus, the time required to transmit IP data through a network may vary significantly. Therefore, best-effort service is not practical for transmitting real-time IP data such as voice data or real-time image data. Instead, QOS routing and resource allocation should be utilized when transmitting real-time IP data.

Network communication devices that support QOS and resource allocation typically use multiple queues in which each queue is associated with a particular QOS or a particular data flow. A portion of the device's resources, such as bandwidth, are allocated to a particular queue within the device. Since IP data packets may have different sizes (i.e., lengths), network communication devices that contain multiple queues require a mechanism or procedure for servicing those queues. Known systems utilize a time stamp associated with each data packet at the arrival time to the various queues. The queues are serviced based on the queue priority and the time stamp of the data packets stored in the queue. This use of a time stamp for each data packet increases the complexity of the queue servicing procedure by requiring the generation and maintenance of time stamps. Additionally, the queue servicing procedure is complicated by requiring the comparison of multiple time stamps to determine the next queue or data packet to service.

SUMMARY OF THE INVENTION

Embodiments of the present invention provide a system for servicing multiple queues without requiring the use of a time stamp associated with each data packet. The multiple queues may be associated with different quality of service (QOS) requirements or different data flows. The data packets stored in each queue typically have different packet lengths.

The multiple queues are serviced based on the bandwidth allocated to each queue and the size (or length) of the packet at the head of each queue (i.e., the next data packet to be transmitted from the queue).

An embodiment of the invention provides a system that identifies a queue service time associated with each of the multiple queues. A particular queue service time is selected that has the minimal value of all identified queue service times. The queue associated with the selected queue service time is then serviced by the system.

Another feature of the invention determines a new service time for the queue associated with the selected queue service time.

Other embodiments of the invention continuously service the multiple queues while at least one queue contains data.

A particular embodiment of the invention calculates the queue service time associated with a particular queue in response to the size of the packet at the head of the particular queue and a bandwidth allocated to the particular queue.

Another embodiment of the invention calculates the queue service time associated with a particular queue in response to the size of the packet at the head of the particular queue and a service interval associated with the particular queue.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The present invention provides a system for servicing multiple queues. The multiple queues may be associated with different quality of service (QOS) requirements or different data flows. The data packets stored in the queues may have different lengths. As discussed in greater detail below, the order in which the multiple queues are serviced is based on the bandwidth allocated to each queue and the size of the packet at the head of each queue (i.e., the next data packet in each queue to be transmitted). The use of multiple queues and the allocation of bandwidth to each queue permits the transmission of real-time data without significant disruption of the data flow and guarantees each queue an allocated bandwidth.

Figure 1:
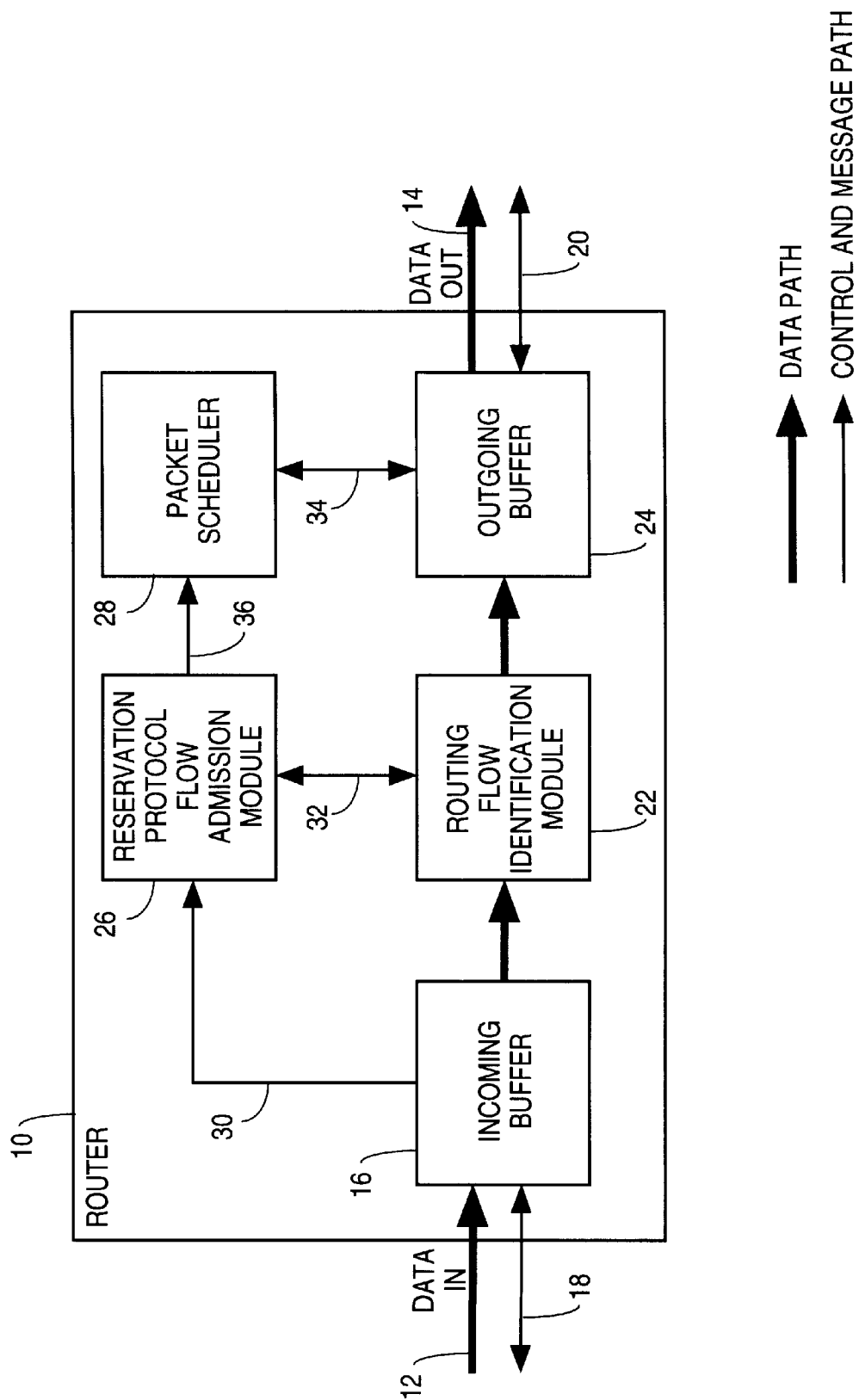
FIG. 1 illustrates a block diagram of an embodiment of a router capable of implementing the teachings of the present invention.

FIG. 1 illustrates a block diagram of an embodiment of a router 10 capable of implementing the teachings of the present invention. For purposes of explanation, the present invention is described as embodied in a router. However, those of ordinary skill in the art will appreciate that various other network communication devices such as switches (including asynchronous transfer mode (ATM) switches and IP switches), data servers, and similar devices may utilize the teachings of the present invention. In a particular embodiment of the invention, router 10 is an Internet Protocol (IP) router. However, it will be appreciated that the present invention can be used with various other protocols.

Referring to FIG. 1, router 10 receives data packets on communication medium 12 (labeled "Data IN") and transmits data packets on communication medium 14 (labeled "Data OUT"). Throughout the description of this invention, the term "data packet" shall be understood to include any grouping of one or more data elements of any size, including data cells, data bytes, and the like.

An incoming buffer 16 located in router 10 receives data packets on communication medium 12. Incoming buffer 16 is coupled to a routing flow identification module 22. Module 22 reads information from a data packet's header to determine the data flow with which the packet is associated. Module 22 determines an output port associated with each incoming data packet and forwards the packet to the appropriate output buffer. This data flow information is then used to assign the packet to the proper queue.

Incoming buffer 16 is also coupled to a reservation protocol flow admission module 26. Module 26 may also be referred to as a call admission control module, which determines whether a particular resource reservation request should be accepted or rejected by router 10. If router 10 has sufficient resources and bandwidth to handle the requested data flow, then module 26 may accept the reservation request and establish the requested data flow through router 10. However, if router 10 does not have adequate resources or bandwidth to handle the requested data flow, then the request is denied and the data flow is not established through router 10.

Reservation protocol flow admission module 26 is coupled to routing flow identification module 22 and a packet scheduler 28. Packet scheduler 28 determines the order in which the multiple queues in router 10 are serviced. Packet scheduler 28 communicates a particular queue service order to an outgoing buffer 24 using communication link 34. As discussed in greater detail below, outgoing buffer 24 includes the router's multiple queues and is capable of servicing those queues in response to information received from packet scheduler 28.

As shown in FIG. 1, data packets are received by router 10 at incoming buffer 16 on communication medium 12. The thick arrows indicate the flow of data packets through router 10. For example, data packets flow from incoming buffer 16 to routing flow identification module 22, then to outgoing buffer 24. Finally, the data packets are output on communication medium 14. Although FIG. 1 illustrates a single data input and a single data output, a particular embodiment of router 10 may contain multiple data inputs and multiple data outputs.

Control messages that are received by and communicated within router 10 are indicated by thin arrows. These control messages represent control information and parameters that are used by router 10 to control the flow of data packets through the router. The control messages may include reservation requests, flow control messages, and similar control information. Router 10 receives and transmits control information on communication mediums 18 and 20. Within router 10, communication links 30, 32, 34, and 36 communicate control messages between the various modules, buffers, and packet scheduler 28. Although FIG. 1 illustrates the data path and the control message path with separate arrows, a single port may contain both the data and control message communication mediums. For example, communication links 12 and 18 together can represent a single port and communication links 14 and 20 together can represent another port.

Figure 2:
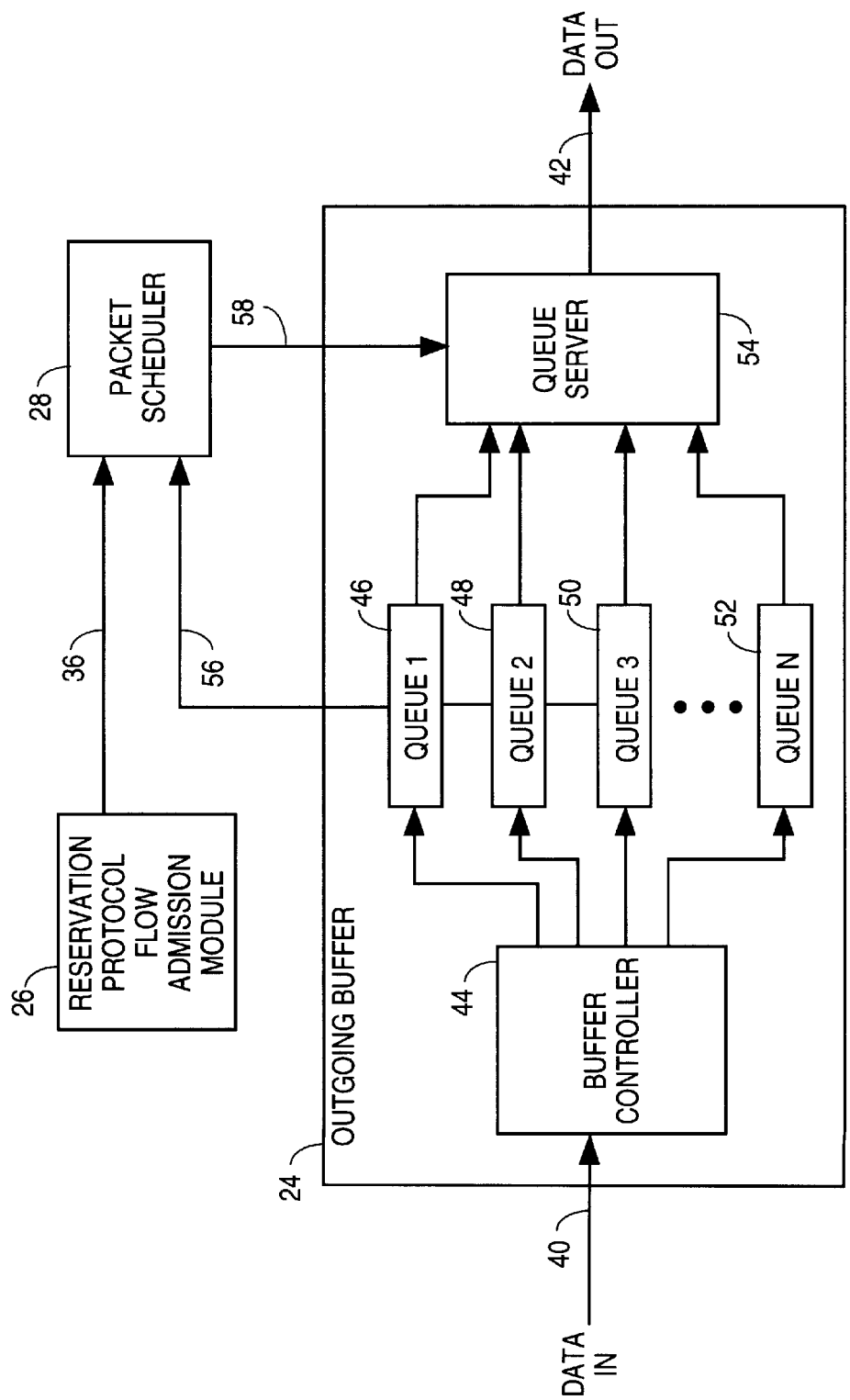
FIG. 2 illustrates an embodiment of a portion of a router including an outgoing buffer containing multiple queues and associated control mechanisms.

FIG. 2 illustrates an embodiment of a portion of a router including an outgoing buffer containing multiple queues and associated control mechanisms. Outgoing buffer 24 receives data from routing flow identification module 22 (FIG. 1) and transmits data on communication link 42. Outgoing buffer 24 includes a buffer controller 44 coupled to multiple queues 46, 48, 50 and 52. Each of the queues 46–52 are coupled to an input of a queue server 54. Queue server 54 is coupled to communication link 42. Although four queues are shown in FIG. 2, a particular router or network communication device may contain any number of queues. In another embodiment of the invention, outgoing buffer 24 uses a shared memory buffer pool and queues 46–52 are address queues associated with the shared memory buffer pool.

Incoming data packets are received from routing flow identification module 22 by buffer controller 44. Buffer controller 44 allocates the received data packets to the appropriate queue 46–52 based on information contained in the header of the data packet. Buffer controller 44 also manages the memory allocation of outgoing buffer 24. When buffer 24 is overloaded, an incoming data packet may be dropped by buffer controller 44.

Outgoing buffer 24 is coupled to packet scheduler 28 through communication links 56 and 58. Communication link 56 provides queue status information from queues 46–52 to packet scheduler 28. The queue status information transmitted on communication link 56 may include the size of the packet at the head of each queue (i.e., the next packet in the queue to be transmitted), and information indicating whether a particular queue is full or empty. Communication line 56 is coupled to each queue 46–52 in outgoing buffer 24 such that the various queue status information is communicated from each queue 46–52 to packet scheduler 28.

Packet scheduler 28 is coupled to reservation protocol flow admission module 26 through communication link 36. Module 26 provides the number of queues and bandwidth allocation information for each queue to packet scheduler 28. Based on the information received from outgoing buffer 24 and module 26, packet scheduler 28 determines which queue will be serviced next. This queue service information is provided to queue server 54 through communication link 58. Queue server 54 individually selects queues 46–52 according to the queue service information determined by packet scheduler 28. When a particular queue is selected by queue server 54, the data packet at the head of the selected queue is transmitted across communication link 42.

One or more of queues 46–52 shown in FIG. 2 may be used for best effort service (no guaranteed QOS). A queue providing best effort service is allocated zero bandwidth.

Therefore, the queue is only serviced when all other queues (having a specific allocated bandwidth) have been serviced.

In a particular embodiment of the invention, router 10 is an IP router capable of handling IP data packets. In this embodiment, IP data packets associated with different IP data flows are buffered in different queues. This buffering of IP data packets can be performed on a per service class basis or a per data flow basis. Providing QOS guarantees for IP data permits the transmission of real-time IP data (e.g., voice data or real-time images) without the delays and unpredictability of best effort services.

A specific embodiment of the invention uses the RSVP resource reservation protocol to establish a data flow having a guaranteed QOS. However, it will be appreciated that other reservation protocols and reservation procedures may be used to establish data flows having a guaranteed QOS.

Figure 3:
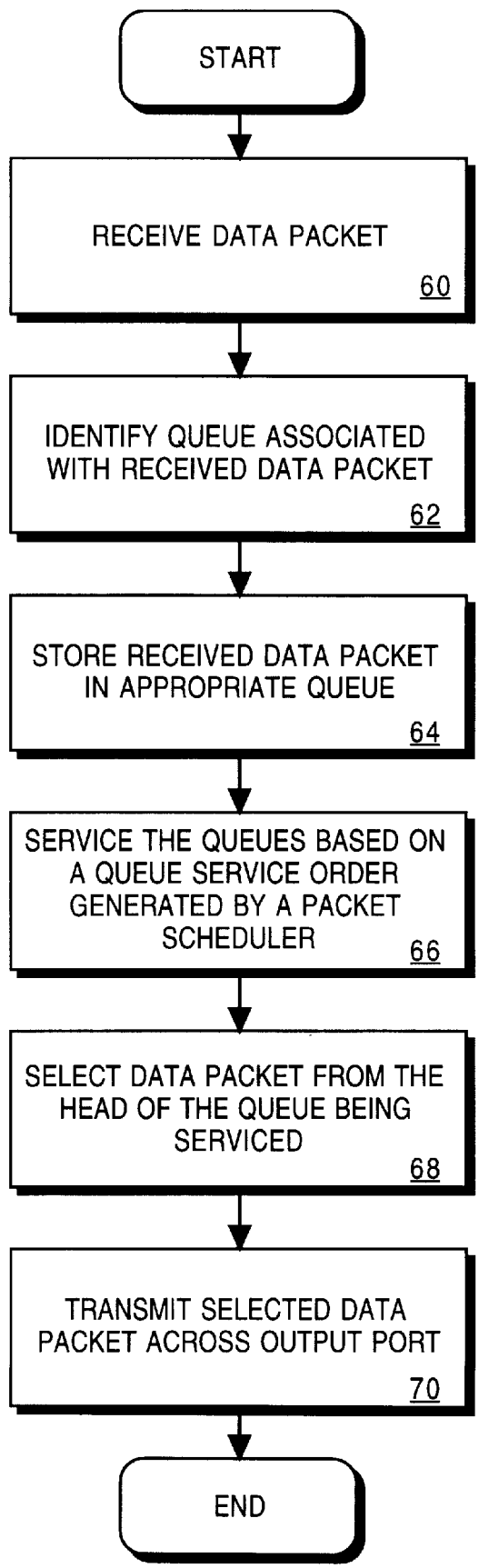
FIG. 3 is a flow diagram illustrating an embodiment of a procedure for servicing multiple queues.

FIG. 3 is a flow diagram illustrating an embodiment of a procedure for servicing multiple queues. At step 60, a data packet is received by a communication device, such as a router. Step 62 identifies the queue associated with the received data packet. As discussed above, this identification may be performed using information contained in the header of the received data packet. At step 64, the received data packet is stored in the appropriate queue, i.e., the queue identified in step 62.

At step 66, the queues within the communication device are serviced based on a queue service order generated by a packet scheduler. At step 68, the procedure selects the data packet from the head of the queue currently being serviced. At step 70, the selected data packet is transmitted across the output port of the router. Although FIG. 3 illustrates a linear procedure for receiving, servicing, and transmitting data packets, it will be appreciated that two or more of these procedures may be performed simultaneously. For example, a particular communication device may receive data packets at the same time that one or more queues are being serviced. Similarly, one or more data packets may be received by a communication device at the same time one or more data packets are transmitted from the communication device.

Figure 4:
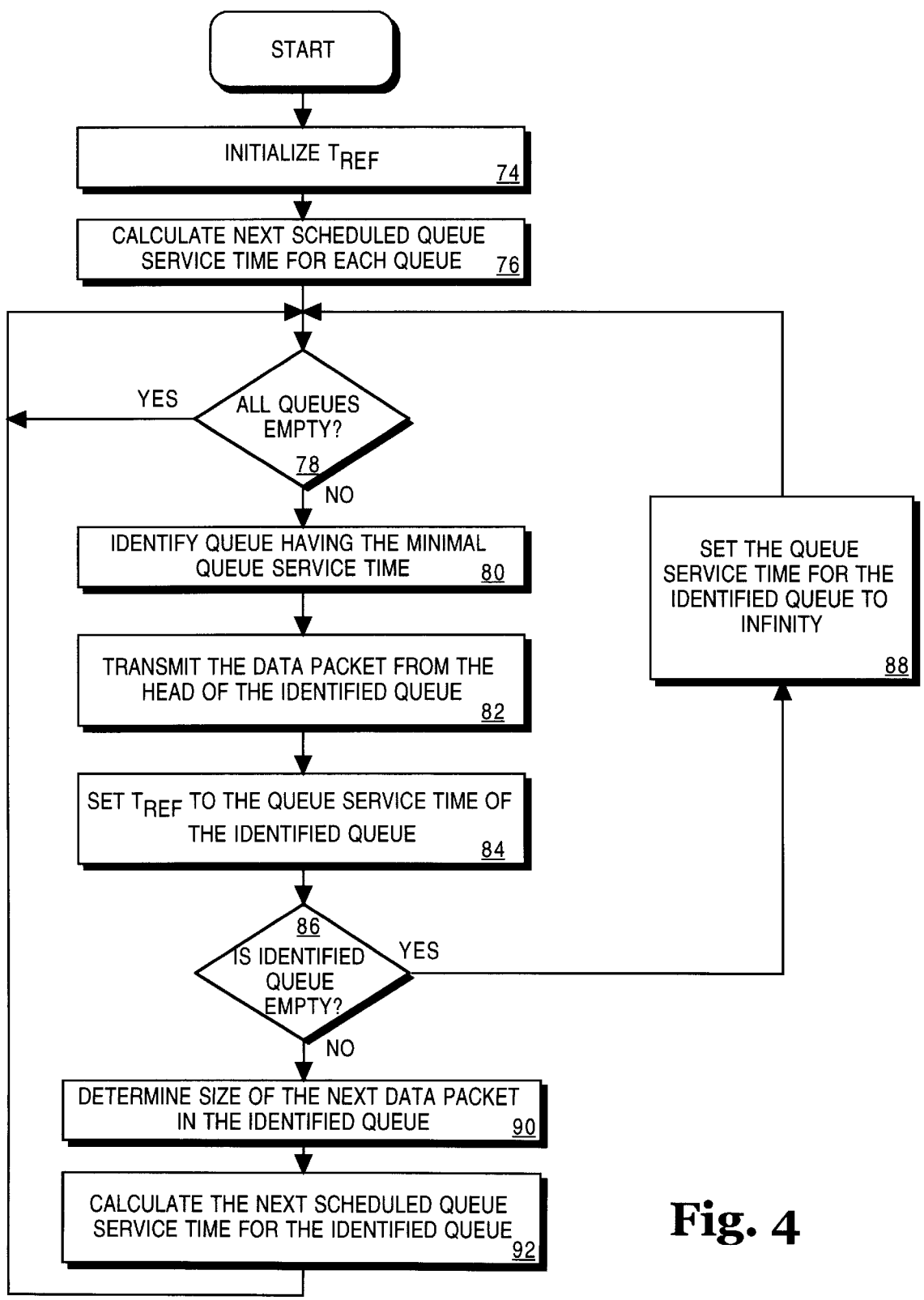
FIG. 4 is a flow diagram illustrating an embodiment of a procedure for determining a service order for multiple queues.

FIG. 4 is a flow diagram illustrating an embodiment of a procedure for determining a service order for multiple queues. At step 74, the variable $T_{ref}$ is initialized. $T_{ref}$ is a reference time (or an index time), which is described in greater detail below. Step 76 calculates the next scheduled queue service time for each queue. Step 78 then determines whether all queues are empty. If all queues are empty, the procedure returns to step 78 and continuously tests for the arrival of a data packet in one or more queues.

If one or more queues contain data at step 78, the procedure continues to step 80 to identify the queue having the minimal queue service time. Various procedures may be used to identify the queue having the minimal queue service time. Exemplary procedures include a calendar queue and a priority queue.

Step 82 transmits the data packet from the head of the queue identified at step 80. Next, step 84 sets variable $T_{ref}$ to the queue service time of the queue identified at step 80. Step 86 then determines whether the queue identified at step 80 is empty. If step 86 determines that the identified queue is empty, the procedure branches to step 88 where the queue service time for the identified queue is set to infinity. Setting the queue service time to infinity ensures that the queue will not be serviced while it remains empty. When a new data packet is added to the queue, the queue service time will be changed from infinity to an appropriate value (discussed below).

If step 86 determines that the identified queue is not empty, the procedure continues to step 90 to determine the size of the next data packet in the identified queue. Step 92 then calculates the next scheduled queue service time for the identified queue and returns to step 78.

In a particular embodiment, the procedure described above with respect to FIG. 4 is implemented using the variables, equations, and algorithms discussed below. The variables and other parameters discussed below are typically stored in registers within the router. The total bandwidth for a particular port is represented by the variable B. The portion of the total bandwidth allocated to a particular queue is represented by variable F(i), where i represents the ith queue. The allocated bandwidth F(i) is used by the reservation protocol flow admission module (or call admission control module) to accept or reject a request to reserve resources in queue i. F(i) is also used to determine the QOS guarantees that can be provided to a particular data flow.

A normalized queue service interval is represented by variable I(i), which is defined by the equation:

$$I(i) = \frac{1}{F(i)}$$

Thus, the queue service interval I(i) for a particular queue is inversely proportional to the bandwidth F(i) allocated to the queue. The queue service interval I(i) identifies the time period between consecutive servicing of queue i. If F(i)=0, indicating a best effort queue, the queue service interval I(i) is set to infinity. When I(i) is set to infinity, the queue will only be serviced when all other queues having a non-infinite value for I(i) are empty.

A scheduling algorithm determines the queue service time for each queue based on the queue's service interval, I(i), and the length of the data packet at the head of the queue, P(i). Each queue may contain variable-length data packets. Therefore, the length of the data packet P(i) at the head of the queue is used when determining the queue service order. Although the scheduling algorithm is capable of handling variable-length data packets, the algorithm is also capable of handling fixed-length data packets.

A variable T(i) represents the next scheduled service time for queue i. $T_{ref}$ represents a reference time (or index time) used by the scheduling algorithm.

When the scheduling algorithm begins, the value of $T_{ref}$ is initialized to zero (e.g., FIG. 4, step 72). The value of T(i) is initially calculated for each queue using the following equation: T(i)=I(i). The scheduling algorithm then selects the non-empty queue having the smallest T(i) value to be serviced. The data packet at the head of queue i is then transmitted across the device's output port. If all queues are empty, then the algorithm waits until a queue receives a data packet. If two or more queues have the same T(i) value, various procedures may be used to break the "tie". In one embodiment, the queue having the smallest value i is serviced first. Alternatively, the queue having the smallest P(i) value can be serviced first. Those of ordinary skill in the art will appreciate that various other procedures may be utilized to break a "tie" between two or more queues having identical T(i) values.

After the appropriate queue has been serviced, the value of $T_{ref}$ is set to the value of T(i) for the queue just serviced (queue i). If queue i is empty, T(i) is set to infinity. If queue i is not empty, a new value for T(i) is calculated as follows:

$$T(i) = T_{ref} + I(i) \times P(i)$$

The scheduling algorithm then determines the next queue to service by identifying the smallest value of T(i) and services the queue as described above.

When a data packet is received into a previously empty queue, the next scheduled service time T(i) for the queue is calculated according to the equation above, $T(i)=T_{ref}+I(i)\times P(i)$. When a data packet is received into a non-empty queue, the service time for the packet will be calculated when the packet reaches the head of the queue, using the algorithm described above.

Figure 5:
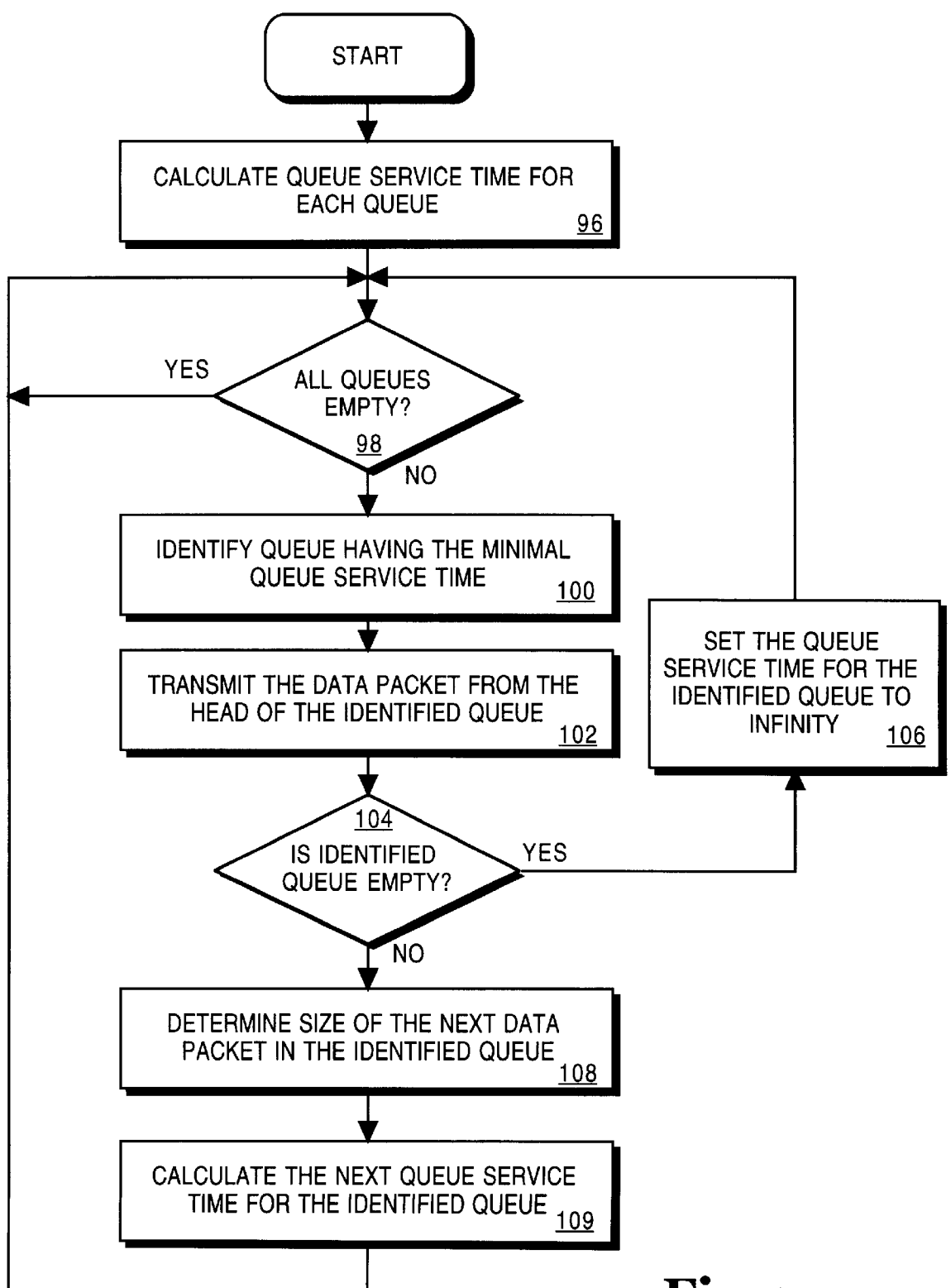
FIG. 5 is a flow diagram illustrating another embodiment of a procedure for determining a service order for multiple queues.

FIG. 5 is a flow diagram illustrating another embodiment of a procedure for determining a service order for multiple queues. The procedure illustrated in FIG. 5 is similar to the procedure of FIG. 4, but does not use the variable $T_{ref}$. The procedure of FIG. 5 uses a linear search to identify a queue having the minimal queue service time. Since a linear search requires considerable resources in a system having many queues, the procedure of FIG. 5 is particularly useful for servicing a small number of queues (e.g., up to approximately 16 queues).

Step 94 of FIG. 5 determines the size of the data packet at the head of each queue. Step 96 calculates a queue service time for each queue in the router or communication device. Step 98 then determines whether all queues are empty. If step 98 determines that all queues are empty, the procedure returns to step 98 to continuously test for the addition of a data packet to one or more queues. If at least one queue contains data, the procedure continues to step 100 to identify the queue having the minimal queue service time. Step 102 then transmits the data packet from the head of the identified queue across the output port of the communication device. Step 104 then determines whether the identified queue is empty. If the queue is empty, the procedure branches to step 106 to set the queue service time for the identified queue to infinity. The procedure then returns to step 98.

If step 104 determines that the identified queue is not empty, the procedure continues to step 108 to determine the size of the next data packet in the identified queue. Step 110 then calculates the next queue service time for the identified queue. The procedure then returns to step 98.

As mentioned above, the procedure illustrated in FIG. 5 is similar to the procedure of FIG. 4, but does not require the use of the variable $T_{ref}$. The procedure of FIG. 5 is useful for servicing a small number of queues (e.g., up to approximately 16 queues). In a particular embodiment, the procedure described above with respect to FIG. 5 is implemented using the variables, equations, and algorithms discussed below. A variable R(i) is used to identify a queue service time for queue i. Variable R(i) represents the time remaining until queue i will be serviced.

The scheduling algorithm begins by initializing $R_{min}$ to zero. Next, the value of R(i) is initially calculated for each queue using the following equation: R(i)=I(i). The algorithm then identifies a non-empty queue having the smallest value of R(i). This identification can be performed by setting $R_{next}$=infinity and evaluating the following equation for each queue:

$$R(i)=max(R(i)-R_{min}, 0)$$

If $R(i)<R_{next}$ then queue i contains data. In this situation, the value of $R_{next}$ is set to the value of R(i). Additionally, the value of $R_{min}$ is set to the value of $R_{next}$. This procedure is repeated until all queues have been evaluated. The queue with the smallest value R(i) is serviced by transmitting the data packet at the head of the queue to the output port. If queue i is non-empty, then the algorithm determines the packet size P(i) of the next packet in the queue and calculates the time remaining until the next service time, using the following formula:

$$R(i)=R_{min}+I(i)\times P(i)$$

If queue i is empty, then R(i) is set to infinity. The value of R(i) will be recalculated upon storage of a data packet in queue i. At that time, R(i) is calculated using the formula above, $R(i)=R_{min}+I(i)\times P(i)$.

If, after evaluating each queue, $R_{next}$=infinity, then all queues are empty. In this situation, the procedure waits until one or more queues receives data for servicing. When data is received, the queues are serviced using the scheduling algorithm described above.

When a data packet is received into a previously empty queue, the value of R(i) for the queue is calculated according to the above equation, $R(i)=R_{min}+I(i)\times P(i)$. When a data packet is received into a non-empty queue, the service time for the packet will be calculated when the packet reaches the head of the queue, using the algorithm described above.

Figure 6:
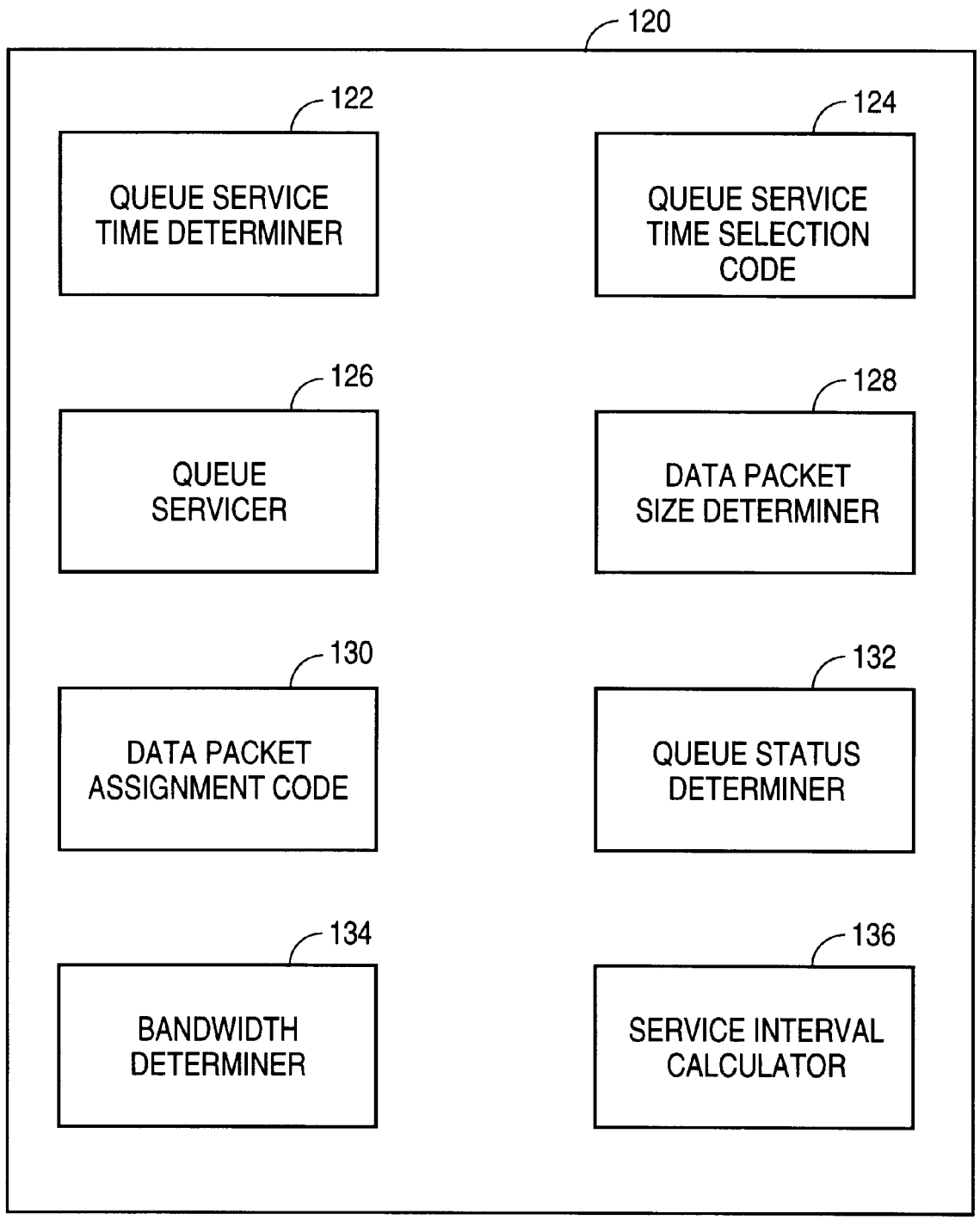
FIG. 6 illustrates an embodiment of a processor-readable medium containing various information used by a computer or other processing device.

FIG. 6 illustrates an embodiment of a processor-readable medium 120 containing various code sequences and other information used by a computer or other processing device. The embodiment illustrated in FIG. 6 is suitable for use with the systems for servicing multiple queues discussed above. The information stored on medium 120 may perform various operations, such as the procedures described above with respect to FIGS. 3, 4, and 5. Processor-readable medium 120 may also be referred to as a computer-readable medium. Processor-readable medium 120 may be any type of storage medium including magnetic, optical, or electrical storage medium, such as a disk drive, diskette, CD-ROM, memory device, or similar storage medium.

Processor-readable medium 120 includes a queue service time determiner 122 used to calculate or determine the queue service time associated with a particular queue. Queue service time selection code 124 is capable of selecting the minimal queue service time from a group of service times. A queue servicer 126 services queues according to the order identified by the queue servicing system. A data packet size determiner 128 determines the size of the data packet at the head of each queue. Data packet assignment code 130 assigns data packets to the appropriate queue based on information contained in the packet header. A queue status determiner 132 determines the status of the various queues, such as whether the queue is empty or full. A bandwidth determiner 134 determines the bandwidth allocated to each queue. A service interval calculator 136 calculates the service interval for each queue.

Alternate embodiments of processor-readable medium 120 may include only a portion of the code sequences and information shown in FIG. 6. Additionally, other code sequences, instructions, parameters, and information may be generated during execution of the various procedures described herein. Those of ordinary skill in the art will appreciate that various code sequences, instructions, and procedures may be utilized by an end-system to implement the teachings of the present invention.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for servicing multiple queues, the method comprising the steps of:

(a) identifying a queue service time associated with each of the multiple queues;

(b) selecting a particular queue service time having the minimal value of all queue service times identified in step (a); and (c) servicing the queue associated with the particular queue service time selected in step (b).

2. The method of claim 1 further including the step of:

(d) determining a new queue service time associated with the queue serviced in step (c).

3. The method of claim 1 further including the step of assigning a value of infinity to queue service times associated with empty queues.

4. The method of claim 1 wherein the queue service time associated with a particular queue is calculated in response to the size of the packet at the head of the particular queue and a bandwidth allocated to the particular queue.

5. The method of claim 1 wherein the queue service time associated with a particular queue is calculated in response to the size of the packet at the head of the particular queue and a service interval associated with the particular queue.

6. The method of claim 1 further including the step of repeating steps (a) through (c) while at least one of the multiple queues contains data.

7. The method of claim 1 wherein the method is performed by a network routing device.

8. The method of claim 1 wherein the method is performed by an Internet Protocol (IP) switch.

9. The method of claim 1 wherein the method is performed by an asynchronous transfer mode (ATM) switch.

10. The method of claim 1 wherein the method is performed by a switching system product.

11. The method of claim 1 wherein the method is performed by a transmission system product.

12. An apparatus for servicing a plurality of queues, the apparatus comprising:

a scheduler coupled to the plurality of queues and configured to determine an order for servicing the plurality of queues;

a queue server coupled to the scheduler and the plurality of queues, wherein the queue server is configured to select a particular queue in response to a queue service time determined by the scheduler, and wherein the queue server is configured to transmit data from the selected queue to a data output.

13. The apparatus of claim 12 wherein the scheduler is configured to determine the order for servicing the plurality of queues based on the size of the packet at the head of the particular queue and a bandwidth allocated to the particular queue.

14. The apparatus of claim 12 wherein the scheduler is configured to determine the order for servicing the plurality of queues based on the size of the packet at the head of the particular queue and a service interval associated with the particular queue.

15. The apparatus of claim 12 wherein the apparatus is contained in an Internet Protocol (IP) routing device.

16. The apparatus of claim 12 wherein the apparatus is contained in an Internet Protocol (IP) switch.

17. The apparatus of claim 12 wherein the apparatus is contained in an asynchronous transfer mode (ATM) switch.

18. The apparatus of claim 12 wherein the apparatus is contained in a switching system product.

19. The apparatus of claim 12 wherein the apparatus is contained in a transmission system product.

20. An apparatus for servicing multiple queues, the apparatus comprising:

means for identifying a queue service time associated with each of the multiple queues;

means for selecting a particular queue service time having the minimal value of all queue service times; and means for servicing the queue associated with the particular queue service time having the minimal value of all queue service times.

21. The apparatus of claim 20 further including means for determining a new queue service time associated with a serviced queue.

22. The apparatus of claim 20 wherein the queue service time associated with a particular queue is calculated in response to the size of the packet at the head of the particular queue and a bandwidth allocated to the particular queue.

23. The apparatus of claim 20 wherein the queue service time associated with a particular queue is calculated in response to the size of the packet at the head of the particular queue and a service interval associated with the particular queue.

24. The apparatus of claim 20 wherein the apparatus is contained in a network routing device.

25. The apparatus of claim 20 wherein the apparatus is an Internet Protocol (IP) switch.

26. The apparatus of claim 20 wherein the apparatus is an asynchronous transfer mode (ATM) switch.

27. The apparatus of claim 20 wherein the apparatus is contained in a switching system product.

28. The apparatus of claim 20 wherein the apparatus is contained in a transmission system product.

29. A computer software product including a medium readable by a processor, the medium having stored thereon:

a first sequence of instructions which, when executed by the processor, causes the processor to identify a queue service time associated with each of a plurality of queues;

a second sequence of instructions which, when executed by the processor, causes the processor to select a particular queue service time having the minimal value of all queue service times; and a third sequence of instructions which, when executed by the processor, causes the processor to service the queue associated with the particular queue service time having the minimal value of all queue service times.

30. The computer software product of claim 29 wherein the medium further includes a fourth sequence of instructions which, when executed by the processor, causes the processor to determine a new queue service time associated with the queue serviced by the third sequence of instructions.

31. The computer software product of claim 29 wherein the first sequence of instructions calculates a service time associated with a particular queue in response to the size of the packet at the head of the particular queue and a bandwidth allocated to the particular queue.

32. The computer software product of claim 29 wherein the first sequence of instructions calculates a service time associated with a particular queue in response to the size of the packet at the head of the particular queue and a service interval associated with the particular queue.

\* \* \* \* \*